United States Patent
Tabei et al.

(10) Patent No.: US 7,019,100 B2
(45) Date of Patent: Mar. 28, 2006

(54) CURABLE SILICONE RESIN COMPOSITION

(75) Inventors: Eiichi Tabei, Annaka (JP); Mitsuhiro Takarada, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 16 days.

(21) Appl. No.: 10/829,282

(22) Filed: Apr. 22, 2004

(65) Prior Publication Data

US 2004/0214966 A1 Oct. 28, 2004

(30) Foreign Application Priority Data

Apr. 23, 2003 (JP) .............................. 2003-118670

(51) Int. Cl.
*C08G 77/50* (2006.01)
(52) U.S. Cl. .................... 528/43; 528/15; 528/31; 528/32; 528/37; 525/478; 525/479
(58) Field of Classification Search ................ 528/31, 528/32, 35
See application file for complete search history.

(56) References Cited

U.S. PATENT DOCUMENTS 5,623,030 A * 4/1997 Tsumura et al. ............ 525/478

OTHER PUBLICATIONS abstract of "Synthesis and some Properties of Poly[(phenylenesilcarbo)organocyclosiloxanes]" published in Vysokomolekulyarnye Soedineniya, Seriya A (1993), 35(5), pp 475-480.*
U.S. Appl. No. 10/917,280, filed Aug. 13, 2004, Tabei, et al.
U.S. Appl. No. 10/960,048, filed Oct. 8, 2004, Tabei.
U.S. Appl. No. 11/087,599, filed Mar. 24, 2005, Tabei, et al.

* cited by examiner

*Primary Examiner*—Marc S. Zimmer
(74) *Attorney, Agent, or Firm*—Oblon, Spivak, McClelland, Maier & Neustadt, P.C.

(57) ABSTRACT

A curable silicone resin composition is provided which is useful as a material for optical devices or parts, insulation material for electronic devices or parts, or coating material, and which produces a cured product having high hardness and strength and further having good optical transmission in the short wavelength region. The composition includes (A) an aromatic hydrocarbon compound having at least two hydrogen atoms bonded to silicon atoms with the silicon atoms being bonded to the hydrocarbon skeleton of the aromatic hydrocarbon compound, (B) a cyclic siloxane compound having at least two silicon atom-bonded alkenyl groups, and (C) a hydrosilylation reaction catalyst, or (D) an aromatic hydrocarbon compound having at least two alkenyl groups bonded to silicon atoms with the silicon atoms being bonded to the hydrocarbon skeleton of the aromatic hydrocarbon compound, (E) a cyclic siloxane compound having at least two silicon atom-bonded hydrogen atoms, and (C) a hydrosilylation reaction catalyst.

20 Claims, No Drawings

CURABLE SILICONE RESIN COMPOSITION

BACKGROUND OF THE INVENTION

1. Field of the Invention

The present invention relates to a curable silicone resin composition which is useful as a material for optical devices or parts, insulation material for electronic devices or parts, or coating material.

2. Description of the Prior Art

Conventionally, epoxy resins have been generally used as a material for optical devices or parts, in particular, sealing material for light emitting diode (LED) elements. In addition, it has been attempted to use a silicone resin as a molding material for LED elements (see Patent Documents 1 and 2) and also to use it as a color filter material (see Patent Document 3). However, examples of practical applications are few.

Recently, under circumstances where white LEDs are paid attention to, problems, which were not subjects of discussion before, such as yellowing of an epoxy sealing material caused by ultraviolet rays or cracking caused by increase of heat generation associated with downsizing of the white LEDs have occurred and solution is sought urgently. To address these problems, use of a cured product of a silicone resin with a number of phenyl groups is examined. Meanwhile, LED light sources which emit light with a shorter wavelength tend to be used presently. However, since epoxy sealing materials and phenyl group-containing silicone resin sealing materials have poor optical transmission in the short wavelength region, they are unsuitable to be applied to LEDs which emit light in the short wavelength region.

Patent Document 1: Japanese Laid-open Patent publication (kokai) No. Hei 10-228249 (JP10-228249A)

Patent Document 2: Japanese Laid-open Patent publication (kokai) No. Hei 10-242513 (JP10-242513A)

Patent Document 3: Japanese Laid-open Patent publication (kokai) No. 2000-123981 (JP2000-123981A)

SUMMARY OF THE INVENTION

The present invention has been made in consideration of the aforementioned circumstances and has an object to provide a curable silicone resin composition which is useful as a material for optical devices or parts, insulation material for electronic devices or parts, or coating material, and which produces a cured product having high hardness and strength and further having good optical transmission in the short wavelength region.

The present inventors made extensive efforts to achieve this object. As a result, the present inventors have discovered that a silicone resin composition comprising an aromatic hydrocarbon compound having hydrogen atoms or alkenyl groups bonded to silicon atoms with said silicon atoms being bonded to the hydrocarbon skeleton of said aromatic hydrocarbon compound, and a cyclic siloxane compound having silicon atom-bonded alkenyl groups or hydrogen atoms in combination gives, on curing with hydrosilylation reaction, a cured product having the aforementioned properties. Based on this discovery, the present inventors have completed the present invention.

Thus, as the first aspect, the present invention provides a curable silicone resin composition comprising:

(A) an aromatic hydrocarbon compound having at least two hydrogen atoms bonded to silicon atoms, said silicon atoms being bonded to the hydrocarbon skeleton of said aromatic hydrocarbon compound;

(B) a cyclic siloxane compound having at least two silicon atom-bonded alkenyl groups; and (C) a hydrosilylation reaction catalyst (hereinafter referred to as "first invention").

As the second aspect, the present invention provides a curable silicone resin composition comprising:

(D) an aromatic hydrocarbon compound having at least two alkenyl groups bonded to silicon atoms, said silicon atoms being bonded to the hydrocarbon skeleton of said aromatic hydrocarbon compound;

(E) a cyclic siloxane compound having at least two silicon atom-bonded hydrogen atoms; and (C) a hydrosilylation reaction catalyst (hereinafter referred to as "second invention").

Hereinafter, silicon atom-bonded hydrogen atoms are sometimes referred to as "SiH groups".

In the second invention, $-CH=CH_2$ groups in the alkenyl groups bonded to silicon atoms contained in the aromatic hydrocarbon compound undergo hydrosilylation addition reaction, well-known to a person skilled in the art, with SiH groups contained in the cyclic siloxane compound. In the first invention, SiH groups contained in the aromatic hydrocarbon compound undergo hydrosilylation addition reaction with $-CH=CH_2$ groups in the alkenyl groups bonded to silicon atoms contained in the cyclic siloxane compound. Both inventions are equivalent in that they form the same linkage structure to provide cured products.

The curable silicone resin composition of the present invention can provide a cured product having high hardness and strength, good optical transmission rate for light in the short wavelength region, and excellent transparency. Therefore, the composition can preferably be used, for example, for protection, sealing, or adhesion of LED elements, change or adjustment of wavelength of LED elements, or lenses of LED elements. The composition can also be used as various optical materials such as a lens material, sealing material for optical devices or parts, or display material, insulation material for electronic devices or parts, and coating material.

DETAILED DESCRIPTION OF THE PREFERRED EMBODIMENTS

The present invention will now be described below in detail.

First Invention

[(A) Aromatic Hydrocarbon Compound]

The component (A) is an aromatic hydrocarbon compound having at least two SiH groups, said silicon atoms being bonded to the hydrocarbon skeleton of said aromatic hydrocarbon compound.

Preferably, the component (A) is, for example, a compound represented by the general formula (1):

$$HR^1R^2Si\text{-}A\text{-}SiR^3R^4H \qquad (1)$$

wherein $R^1$, $R^2$, $R^3$, and $R^4$ each independently represent a hydrogen atom or a group selected from the group consisting of an unsubstituted monovalent hydrocarbon group having 1 to 12 carbon atoms and preferably 1 to 6 carbon atoms except an alkenyl group, a substituted monovalent hydrocarbon group having 1 to 12 carbon atoms and preferably 1 to 6 carbon atoms except an alkenyl group, and an alkoxy group having 1 to 6 carbon atoms and preferably 1 to 4 carbon atoms; and A represents an aromatic ring-containing divalent hydrocarbon group having 6 to 12 carbon atoms and preferably 6 to 10 carbon atoms.

When the $R^1$ to $R^4$ are monovalent hydrocarbon groups except alkenyl groups, examples thereof include alkyl groups such as methyl groups, ethyl groups, propyl groups, isopropyl groups, butyl groups, tert-butyl groups, pentyl groups, isopentyl groups, hexyl groups, and sec-hexyl groups; aryl groups such as phenyl groups and o-, m-, or p-tolyl groups; aralkyl groups such as benzyl groups and 2-phenylethyl groups; and groups in which at least one hydrogen atom of these groups have been substituted with halogen atoms, cyano groups, epoxy group-containing groups, or the like, for example, halogenated alkyl groups such as chloromethyl groups, 3-chloropropyl groups, and 3,3,3-trifluoropropyl groups, 2-cyanoethyl groups, and 3-glycidoxypropyl groups.

When the $R^1$ to $R^4$ are alkoxy groups, examples thereof include methoxy groups, ethoxy groups, propoxy groups, isopropoxy groups, butoxy groups, sec-butoxy groups, and tert-butoxy groups.

Of compounds represented by the general formula (1), those in which all of the $R^1$ to $R^4$ are methyl groups are preferred because they are easy to industrially produce and are easily available.

Examples of aromatic ring-containing hydrocarbon groups represented by the A include o-, m-, or p-phenylene groups, tolylene groups, o-, m-, or p-xylylene groups, and divalent arylene groups represented by the formulas:

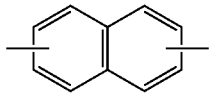 and 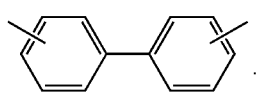

Preferred specific examples of the component (A) are shown blow but are not limited thereto. Hereinafter, "Me" stands for a methyl group, "Et" stands for an ethyl group, "Ph" stands for a phenyl group, "-p-$C_6H_4$—" stands for a para-phenylene group, and "-m-$C_6H_4$—" stands for a meta-phenylene group.

HMe$_2$Si-p-C$_6$H$_4$—SiMe$_2$H
HMe$_2$Si-m-C$_6$H$_4$—SiMe$_2$H
HMePhSi-p-C$_6$H$_4$—SiMePhH
HMePhSi-m-C$_6$H$_4$—SiMePhH
HPh$_2$Si-p-C$_6$H$_4$—SiPh$_2$H
HPh$_2$Si-m-C$_6$H$_4$—SiPh$_2$H
HMeEtSi-p-C$_6$H$_4$—SiMeEtH
HMeEtSi-m-C$_6$H$_4$—SiMeEtH
H(MeO)$_2$Si-p-C$_6$H$_4$—Si(OMe)$_2$H
H(MeO)$_2$Si-m-C$_6$H$_4$—Si(OMe)$_2$H
HMe$_2$Si—CH$_2$-p-C$_6$H$_4$—CH$_2$—SiMe$_2$H
HMe$_2$Si—CH$_2$-m-C$_6$H$_4$—CH$_2$—SiMe$_2$H
HMePhSi—CH$_2$-p-C$_6$H$_4$—CH$_2$—SiMePhH
HMePhSi—CH$_2$-m-C$_6$H$_4$—CH$_2$—SiMePhH

These may be used singularly, or in combination of two or more.

[(B) Cyclic Siloxane Compound]

The component (B) is a cyclic siloxane compound having at least two silicon atom-bonded alkenyl groups and capable of undergoing hydrosilylation addition reaction with the component (A).

Preferably, the component (B) is, for example, a cyclic siloxane compound represented by the general formula (2):

$$(R^aR^5SiO)_n(R^6R^7SiO)_m \qquad (2)$$

wherein $R^a$ represents an alkenyl group having 2 to 6 carbon atoms and preferably 2 to 3 carbon atoms, $R^5$, $R^6$, and $R^7$ each independently represent an unsubstituted or substituted monovalent hydrocarbon group having 1 to 12 carbon atoms and preferably 1 to 6 carbon atoms, n represents an integer from 2 to 10, and m represents an integer from 0 to 8, provided that n+m represents an integer from 3 to 10 and preferably from 3 to 6.

Examples of the $R^a$ include vinyl groups, allyl groups, propenyl groups, isopropenyl groups, butenyl groups, pentenyl groups, and hexenyl groups. Of these, vinyl groups and allyl groups are preferred, and vinyl groups are particularly preferred.

Examples of the $R^5$ to $R^7$ include the alkenyl groups exemplified for the $R^a$ and the monovalent hydrocarbon groups exemplified for the $R^1$ to $R^4$.

Preferred specific examples of the component (B) are shown blow but are not limited thereto. Hereinafter, "Vi" stands for a vinyl group, "Allyl" stands for an allyl group, and "Pr" stands for an n-propyl group.

(ViMeSiO)$_3$
(ViMeSiO)$_4$
(AllylMeSiO)$_3$
(AllylMeSiO)$_4$
(ViMeSiO)$_2$(Me$_2$SiO)$_2$
(ViMeSiO)$_3$(Me$_2$SiO)$_1$
(ViMeSiO)$_2$(PrMeSiO)$_2$
(ViMeSiO)$_3$(PrMeSiO)$_1$ These may be used singularly, or in combination of two or more.

The components (A) and (B) are present in the composition of the first invention such that the quantity of the SiH groups in the component (A) is preferably 0.5 to 2.0 mol and more preferably 0.8 to 1.5 mol per mol of the alkenyl groups in the whole composition. The proportion of the alkenyl groups in the component (B) to the alkenyl groups in the whole composition is preferably 10 mol % or more and particularly preferably 30 mol % or more. In the case where only the component (B) is present in the composition as a component having alkenyl groups, the components (A) and (B) are present in the composition such that the quantity of the SiH groups in the component (A) is preferably 0.5 to 2.0 mol and more preferably 0.8 to 1.5 mol per mol of the alkenyl groups in the component (B).

[(C) Hydrosilylation Reaction Catalyst]

All the hydrosilylation reaction catalysts conventionally known can be used as the component (C). Specific examples thereof include platinum-based catalysts such as platinum black, platinic chloride, chloroplatinic acid, a reaction product of chloroplatinic acid and a monohydric alcohol, a complex of chloroplatinic acid and olefins, and platinum bis(acetoacetate); and platinum group metal-based catalysts such as palladium-based catalysts and rhodium-based catalysts.

Preferably, the quantity of the component (C) is an effective quantity as catalyst. More preferably, a typical quantity, calculated as the weight of the platinum group metal atom within the catalyst relative to the combined weight of the components (A) and (B), is within a range from 1 to 500 ppm and particularly from 2 to 100 ppm.

Second Invention

[(D) Aromatic Hydrocarbon Compound]

The component (D) is an aromatic hydrocarbon compound having at least two alkenyl groups bonded to silicon atoms, said silicon atoms being bonded to the hydrocarbon skeleton of said aromatic hydrocarbon compound.

Preferably, the component (D) is, for example, an aromatic hydrocarbon compound represented by the general formula (3):

$$R^a R^8 R^9 Si\text{-}A\text{-}SiR^{10}R^{11}R^b \quad (3)$$

wherein $R^a$ and $R^b$ each independently represent an alkenyl group having 2 to 6 carbon atoms and preferably 2 to 3 carbon atoms; $R^8$, $R^9$, $R^{10}$, and $R^{11}$ each independently represent a group selected from the group consisting of an unsubstituted monovalent hydrocarbon group having 1 to 12 carbon atoms and preferably 1 to 6 carbon atoms, a substituted monovalent hydrocarbon group having 1 to 12 carbon atoms and preferably 1 to 6 carbon atoms, and an alkoxy group having 1 to 6 carbon atoms and preferably 1 to 4 carbon atoms; and A is as defined for the formula (1).

Examples of the $R^a$ and $R^b$ include the groups exemplified for the $R^a$ as defined for the formula (2). Examples of the $R^8$ to $R^{11}$ include the groups exemplified for the $R^a$ as defined for the formula (2) and the groups exemplified for the $R^1$ to $R^4$ as defined for the formula (1) except a hydrogen atom.

Preferred specific examples of the component (D) are shown blow but are not limited thereto.

ViMe$_2$Si-p-C$_6$H$_4$—SiMe$_2$Vi
ViMe$_2$Si-m-C$_6$H$_4$—SiMe$_2$Vi
ViMePhSi-p-C$_6$H$_4$—SiMePhVi
ViMePhSi-m-C$_6$H$_4$—SiMePhVi
ViMe$_2$Si—CH$_2$-p-C$_6$H$_4$—CH$_2$—SiMe$_2$Vi
ViMe$_2$Si—CH$_2$-m-C$_6$H$_4$—CH$_2$—SiMe$_2$Vi
ViMePhSi—CH$_2$-p-C$_6$H$_4$—CH$_2$—SiMePhVi
ViMePhSi—CH$_2$-m-C$_6$H$_4$—CH$_2$—SiMePhVi
ViMe(MeO)—CH$_2$-p-C$_6$H$_4$—CH$_2$—Si(OMe)MeVi
ViMe(MeO)—CH$_2$-m-C$_6$H$_4$—CH$_2$—Si(OMe)MeVi
ViMe(EtO)—CH$_2$-p-C$_6$H$_4$—CH$_2$—Si(OEt)MeVi
ViMe(EtO)—CH$_2$-m-C$_6$H$_4$—CH$_2$—Si(OEt)MeVi

These may be used singularly, or in combination of two or more.

[(E) Cyclic Siloxane Compound]

The component (E) is a cyclic siloxane compound having at least two SiH groups and capable of undergoing hydrosilylation addition reaction with the component (D).

Preferably, the component (E) is, for example, a cyclic siloxane compound represented by the general formula (4):

$$(HR^{12}SiO)_n(R^{13}R^{14}SiO)_m \quad (4)$$

wherein $R^{12}$, $R^{13}$, and $R^{14}$ each independently represent a hydrogen atom or an unsubstituted or substituted monovalent hydrocarbon group having 1 to 12 carbon atoms and preferably 1 to 6 carbon atoms except an alkenyl group, n represents an integer from 2 to 10, and m represents an integer from 0 to 8, provided that n+m represents an integer from 3 to 10 and preferably from 3 to 6.

Examples of the $R^{12}$ to $R^{14}$ include the groups exemplified for the $R^1$ to $R^4$ as defined for the formula (1) except an alkoxy group.

Preferred specific examples of the component (E) are shown blow but are not limited thereto.

(HMeSiO)$_3$
(HMeSiO)$_4$
(HMeSiO)$_2$(Me$_2$SiO)$_1$
(HMeSiO)$_3$(Me$_2$SiO)$_1$
(HMeSiO)$_4$(Me$_2$SiO)$_1$

These may be used singularly, or in combination of two or more.

The components (D) and (E) are present in the composition of the second invention such that the quantity of the SiH groups in the whole composition is preferably 0.5 to 2.0 mol and more preferably 0.8 to 1.5 mol per mol of the alkenyl groups in the component (D). The proportion of the SiH groups in the component (E) to the SiH groups in the whole composition is preferably 10 mol % or more and particularly preferably 30 mol % or more. In the case where only the component (E) is present in the composition as a component having SiH groups, the components (D) and (E) are present in the composition such that the quantity of the SiH groups in the component (E) is preferably 0.5 to 2.0 mol and more preferably 0.8 to 1.5 mol per mol of the alkenyl groups in the component (D).

[(C) Hydrosilylation Reaction Catalyst]

Examples of the hydrosilylation reaction catalyst of the component (C) include those as shown above. A preferred quantity of the component (C) relative to the combined weight of the components (D) and (E) is also as shown above.

Other Components

In addition to the components (A) to (E), other components may be added to the composition of the present invention as long as the effects of the present invention do not deteriorate.

For example, to adjust the viscosity of a composition or the hardness of a cured product, a straight-chain diorganopolysiloxane or network organopolysiloxane having silicon atom-bonded alkenyl groups or SiH groups, or a non-reactive straight-chain or cyclic diorganopolysiloxane may be added.

In particular, a network organopolysiloxane composed of monofunctional structural units having silicon atom-bonded alkenyl groups or SiH groups and tetrafunctional structural units (SiO$_2$) may preferably be added because it enables the production of a cured product having high transparency and good weatherability.

In the first invention, if (F1) a network organopolysiloxane having silicon atom-bonded alkenyl groups is added, it is present such that the quantity of the SiH groups in the component (A) is preferably 0.5 to 2.0 mol and more preferably 0.8 to 1.5 mol per mol of the alkenyl groups in the sum of the components (F1) and (B). If (F2) a network organopolysiloxane having SiH groups is added, it is present such that the quantity of the SiH groups in the sum of the components (F2) and (A) is preferably 0.5 to 2.0 mol and more preferably 0.8 to 1.5 mol per mol of the alkenyl groups in the component (B).

In the second invention, if (F1) a network organopolysiloxane having silicon atom-bonded alkenyl groups is added, it is present such that the quantity of the SiH groups in the component (E) is preferably 0.5 to 2.0 mol and more preferably 0.8 to 1.5 mol per mol of the alkenyl groups in the sum of the components (F1) and (D). If (F2) a network organopolysiloxane having SiH groups is added, it is present such that the quantity of the SiH groups in the sum of the components (F2) and (E) is preferably 0.5 to 2.0 mol and more preferably 0.8 to 1.5 mol per mol of the alkenyl groups in the component (D).

To ensure a required pot life, reaction retarding agents such as 1-ethynylcyclohexanol and 3,5-dimethyl-1-hexyn-3-ol may be added. Furthermore, to increase the strength of cured products, inorganic fillers such as fumed silica may be added as long as the transparency is not affected. Dyes, pigments, and flame retardants may be added as necessary.

Conditions for curing the composition of the present invention depend on the quantity of the composition and are not particularly restricted. Normally, the composition is preferably cured at 60 to 180° C. for 5 to 180 minutes.

The composition of the present invention can be cured by applying it to a given substrate according to the purpose and then heating the applied composition under the aforementioned conditions.

EXAMPLES

As follows is a more specific description of the present invention, which presents a series of Examples and Comparative Examples, although the present invention is not restricted to the Examples.

Example 1

53 parts by weight of (A) $HMe_2Si$-p-$C_6H_4$—$SiMe_2H$, 47 parts by weight of (B) $(ViMeSiO)_4$ (SiH in (A)/Vi in (B) (molar ratio)=1.0), and 0.03 parts by weight of 1-ethynylcyclohexanol were mixed uniformly. To the mixture obtained, (C) a platinum-vinylsiloxane complex was added in a quantity of 20 ppm calculated as the weight of the platinum atom within the component (C) relative to the combined weight of the components (A) and (B). The resulting solution was mixed uniformly to produce a composition. The composition was poured into a mold assembled from glass plates so as to be 4 mm thick and heated at 150° C. for 2 hours to produce a cured product.

Example 2

A composition was prepared and a cured product was obtained in the same manner as Example 1, with the exception of using 67 parts by weight of (D) $ViMe_2Si$-p-$C_6H_4$—$SiMe_2Vi$ and 33 parts by weight of (E) $(HMeSiO)_4$ (SiH in (E)/Vi in (D) (molar ratio)=1.0) instead of the components (A) and (B) in Example 1.

Example 3

A composition was prepared and a cured product was obtained in the same manner as Example 1, with the exception of using 23 parts by weight of (A) $HMe_2Si$-p-$C_6H_4$—$SiMe_2H$, 17 parts by weight of (B) $(ViMeSiO)_4$, and 60 parts by weight of (F1) a silicone resin with the number average molecular weight of 3,600 represented by the composition formula
$(ViMe_2SiO_{1/2})_3(Me_3SiO_{1/2})_{18}(SiO_2)_{25}$ (SiH in (A)/Vi in (B) and (F1) (molar ratio)=1.0) instead of the components (A) and (B) in Example 1.

Example 4

A composition was prepared and a cured product was obtained in the same manner as Example 1, with the exception of using 33 parts by weight of (A) $ViMe_2Si$-p-$C_6H_4$—$SiMe_2Vi$, 7 parts by weight of (B) $(HMeSiO)_4$, and 60 parts by weight of (F2) a silicone resin with the number average molecular weight of 2,300 represented by the composition formula:
$(HMe_2SiO_{1/2})_5(Me_3SiO_{1/2})_{15}(SiO_2)_{10}$ (SiH in (E) and (F2)/Vi in (D) (molar ratio)=1.0) instead of the components (A) and (B) in Example 1.

Comparative Example 1

41 parts by weight of $(HMeSiO)_4$, 59 parts by weight of $(ViMeSiO)_4$, and 0.03 parts by weight of 1-ethynylcyclohexanol were mixed uniformly. To the obtained mixture, a platinum-vinylsiloxane complex was added in a quantity of 20 ppm calculated as the weight of the platinum atom within the complex relative to the combined weight of the cyclic siloxanes. The resulting solution was mixed uniformly to produce a composition. A cured product was obtained from the composition in the same manner as Example 1.

Comparative Example 2

A bisphenol A-type epoxy resin (brand name: Pelnox ME-540, manufactured by Pelnox Corporation) was poured into a mold assembled from glass plates so as to be 4 mm thick in the same manner as Example 1 and heated at 150° C. for 8 hours to produce a cured product.

Comparative Example 3

A curable phenylsilicone resin composition (brand name: X-34-1195, manufactured by Shin-Etsu Chemical Co., Ltd., phenyl group content: about 50 mol %) was poured into a mold assembled from glass plates so as to be 4 mm thick in the same manner as Example 1 and heated at 150° C. for 8 hours to produce a cured product.

[Methods for Evaluating Properties]

Properties of the cured product obtained in each of the Examples and Comparative Examples was evaluated according to the following methods.

Appearance

The appearance of each cured product was observed, and the results are given in Table 1.

Hardness

According to ASTM D 2240, the hardness (Shore D) of each cured product was measured. The results are given in Table 1.

Elasticity Modulus

A 10 mm×100 mm specimen was prepared from each cured product with a thickness of 4 mm. The specimen was measured for elasticity modulus (MPa) was measured by a three-point bending test according to JIS K-66911. The results are given in Table 1.

Optical Transmission Rate

Using a spectrophotometer, the optical transmission rate of each cured product was measured at four wavelengths: 800, 600, and 400 nm, and 350 nm (ultraviolet region). The results are given in Table 2.

TABLE 1

| Item | Examples | | | | Comparative Examples | | |
|---|---|---|---|---|---|---|---|
| | 1 | 2 | 3 | 4 | 1 | 2 | 3 |
| Appearance | Colorless, transparent | Colorless, transparent | Colorless, transparent | Colorless, transparent | Colorless, transparent | Colorless, transparent | Colorless, transparent |
| Hardness (Shore D) | 65 | 67 | 69 | 68 | 0 | 63 | 64 |
| Elasticity Modulus (MPa) | 1990 | 1900 | 1790 | 1690 | 0 | 1550 | 1520 |

TABLE 2

| Wavelength (nm) | Examples | | | | Comparative Examples | | |
|---|---|---|---|---|---|---|---|
| | 1 | 2 | 3 | 4 | 1 | 2 | 3 |
| 800 | 95% | 95% | 95% | 95% | 94% | 96% | 95% |
| 600 | 95% | 95% | 95% | 95% | 94% | 97% | 95% |
| 400 | 94% | 94% | 95% | 95% | 94% | 92% | 92% |
| 350 | 88% | 88% | 89% | 89% | 89% | 76% | 84% |

[Evaluation]

The cured product of Comparative Example 1 was so soft that its hardness and so on could not be measured. Compared with the cured products of Comparative Examples 2 and 3, the cured product of any Example has excellent hardness and elasticity modulus and also has an excellent optical transmission rate, in particular, at a short wavelength of 350 nm (ultraviolet region).

What is claimed is:

1. A curable silicone resin composition comprising:
   (A) an aromatic hydrocarbon compound having at least two hydrogen atoms bonded to silicon atoms, said silicon atoms being bonded to the hydrocarbon skeleton of said aromatic hydrocarbon compound;
   (B) a cyclic siloxane compound having at least two silicon atom-bonded alkenyl groups;
   (C) a hydrosilylation reaction catalyst; and
   (F1) a network organopolysiloxane having silicon atom-bonded alkenyl groups.

2. The composition according to claim 1, wherein said component (A) is an aromatic hydrocarbon compound represented by the general formula (1):

$$HR^1R^2Si\text{-}A\text{-}SiR^3R^4H \quad (1)$$

wherein $R^1$, $R^2$, $R^3$, and $R^4$ each independently represent a hydrogen atom or a group selected from the group consisting of an unsubstituted monovalent hydrocarbon group having 1 to 12 carbon atoms except an alkenyl group, a substituted monovalent hydrocarbon group having 1 to 12 carbon atoms except an alkenyl group, and an alkoxy group having 1 to 6 carbon atoms; and A represents an aromatic ring-containing divalent hydrocarbon group having 6 to 12 carbon atoms.

3. The composition according to claim 1, wherein said component (B) is a cyclic siloxane compound represented by the general formula (2):

$$(R^aR^5SiO)_n(R^6R^7SiO)_m \quad (2)$$

wherein $R^a$ represents an alkenyl group having 2 to 6 carbon atoms, $R^5$, $R^6$, and $R^7$ each independently represent an unsubstituted or substituted monovalent hydrocarbon group having 1 to 12 carbon atoms, n represents an integer from 2 to 10, and m represents an integer from 0 to 8, provided that n+m represents an integer from 3 to 10.

4. The composition according to claim 1, wherein said components (A) and (B) are present such that the quantity of the silicon atom-bonded hydrogen atoms in said component (A) is 0.5 to 2.0 mol per mol of the alkenyl groups in said component (B), and said component (C) is present in an effective quantity as catalyst.

5. A cured product obtained by curing the composition according to claim 1.

6. A curable silicone resin composition comprising:
   (C) a hydrosilylation reaction catalyst;
   (D) an aromatic hydrocarbon compound having at least two alkenyl groups bonded to silicon atoms, said silicon atoms being bonded to the hydrocarbon skeleton of said aromatic hydrocarbon compound;
   (E) a cyclic siloxane compound having at least two silicon atom-bonded hydrogen atoms; and
   (F1) a network organopolysiloxane having silicon atom-bonded alkenyl groups.

7. The composition according to claim 6, wherein said component (D) is an aromatic hydrocarbon compound represented by the general formula (3):

$$R^aR^8R^9Si\text{-}A\text{-}SiR^{10}R^{11}R^b \quad (3)$$

wherein $R^a$ and $R^b$ each independently represent an alkenyl group having 2 to 6 carbon atoms; $R^8$, $R^9$, $R^{10}$, and $R^{11}$ each independently represent a group selected from the group consisting of an unsubstituted monovalent hydrocarbon group having 1 to 12 carbon atoms, a substituted monovalent hydrocarbon group having 1 to 12 carbon atoms, and an alkoxy group having 1 to 6 carbon atoms; and A represents an aromatic ring-containing divalent hydrocarbon group having 6 to 12 carbon atoms.

8. The composition according to claim 6, wherein said component (E) is a cyclic siloxane compound represented by the general formula (4):

$$(HR^{12}SiO)_n(R^{13}R^{14}SiO)_m \quad (4)$$

wherein $R^{12}$, $R^{13}$, and $R^{14}$ each independently represent a hydrogen atom or an unsubstituted or substituted monovalent hydrocarbon group having 1 to 12 carbon atoms except an alkenyl group, n represents an integer from 2 to 10, and m represents an integer from 0 to 8, provided that n+m represents an integer from 3 to 10.

9. The composition according to claim 6, wherein said components (D) and (E) are present such that the quantity of the silicon atom-bonded hydrogen atoms in said component (E) is 0.5 to 2.0 mol per mol of the alkenyl groups in said component (D), and said component (C) is present in an effective quantity as catalyst.

10. A cured product obtained by curing the composition according to claim 6.

11. A curable silicone resin composition comprising:
(A) an aromatic hydrocarbon compound having at least two hydrogen atoms bonded to silicon atoms, said silicon atoms being bonded to the hydrocarbon skeleton of said aromatic hydrocarbon compound;
(B) a cyclic siloxane compound having at least two silicon atom-bonded alkenyl groups;
(C) a hydrosilylation reaction catalyst; and
(F2) a network organopolysiloxane having silicon atom-bonded hydrogen atoms.

12. The composition according to claim 11, wherein said component (A) is an aromatic hydrocarbon compound represented by the general formula (1):

$$HR^1R^2Si\text{-}A\text{-}SiR^3R^4H \quad (1)$$

wherein $R^1$, $R^2$, $R^3$, and $R^4$ each independently represent a hydrogen atom or a group selected from the group consisting of an unsubstituted monovalent hydrocarbon group having 1 to 12 carbon atoms except an alkenyl group, a substituted monovalent hydrocarbon group having 1 to 12 carbon atoms except an alkenyl group, and an alkoxy group having 1 to 6 carbon atoms; and A represents an aromatic ring-containing divalent hydrocarbon group having 6 to 12 carbon atoms.

13. The composition according to claim 11, wherein said component (B) is a cyclic siloxane compound represented by the general formula (2):

$$(R^aR^5SiO)_n(R^6R^7SiO)_m \quad (2)$$

wherein $R^a$ represents an alkenyl group having 2 to 6 carbon atoms, $R^5$, $R^6$, and $R^7$ each independently represent an unsubstituted or substituted monovalent hydrocarbon group having 1 to 12 carbon atoms, n represents an integer from 2 to 10, and m represents an integer from 0 to 8, provided that n+m represents an integer from 3 to 10.

14. The composition according to claim 11, wherein said components (A) and (B) are present such that the quantity of the silicon atom-bonded hydrogen atoms in said component (A) is 0.5 to 2.0 mol per mol of the alkenyl groups in said component (B), and said component (C) is present in an effective quantity as catalyst.

15. A cured product obtained by curing the composition according to claim 11.

16. A curable silicon resin composition comprising:
(C) a hydrosilylation reaction catalyst;
(D) an aromatic hydrocarbon compound having at least two alkenyl groups bonded to silicon atoms, said silicon atoms being bonded to the hydrocarbon skeleton of said aromatic hydrocarbon compound;
(E) a cyclic siloxane compound having at least two silicon atom-bonded hydrogen atoms; and
(F2) a network organopolysiloxane having silicon atom-bonded hydrogen atoms.

17. The composition according to claim 16, wherein said component (D) is an aromatic hydrocarbon compound represented by the general formula (3):

$$R^aR^8R^9Si\text{-}A\text{-}SiR^{10}R^{11}R^b \quad (3)$$

wherein $R^a$ and $R^b$ each independently represent an alkenyl group having 2 to 6 carbon atoms; $R^8$, $R^9$, $R^{10}$, and $R^{11}$ each independently represent a group selected from the group consisting of an unsubstituted monovalent hydrocarbon group having 1 to 12 carbon atoms, a substituted monovalent hydrocarbon group having 1 to 12 carbon atoms, and an alkoxy group having 1 to 6 carbon atoms; and A represents an aromatic ring-containing divalent hydrocarbon group having 6 to 12 carbon atoms.

18. The composition according to claim 16, wherein said component (E) is a cyclic siloxane compound represented by the general formula (4):

$$(HR^{12}SiO)_n(R^{13}R^{14}SiO)_m \quad (4)$$

wherein $R^{12}$, $R^{13}$, and $R^{14}$ each independently represent a hydrogen atom or an unsubstituted or substituted monovalent hydrocarbon group having 1 to 12 carbon atoms except an alkenyl group, n represents an integer from 2 to 10, and m represents an integer from 0 to 8, provided that n+m represents an integer from 3 to 10.

19. The composition according to claim 16, wherein said components (D) and (E) are present such that the quantity of the silicon atom-bonded hydrogen atoms in said component (E) is 0.5 to 2.0 mol per mol of the alkenyl groups in said component (D), and said component (C) is present in an effective quantity as catalyst.

20. A cured product obtained by curing the composition according to claim 16.

* * * * *